(12) United States Patent
Chhabra et al.

(10) Patent No.: US 7,243,354 B1
(45) Date of Patent: Jul. 10, 2007

(54) SYSTEM AND METHOD FOR EFFICIENTLY PROCESSING INFORMATION IN A MULTITHREAD ENVIRONMENT

(75) Inventors: Pankaj Chhabra, Sunnyvale, CA (US); Sanjay Katabathuni, Santa Clara, CA (US); Anand Rajagopalan, Santa Clara, CA (US)

(73) Assignee: 3Com Corporation, Marlborough, MA (US)

( * ) Notice: Subject to any disclaimer, the term of this patent is extended or adjusted under 35 U.S.C. 154(b) by 491 days.

(21) Appl. No.: 10/118,681

(22) Filed: Apr. 8, 2002

(51) Int. Cl.
*G06F 9/46* (2006.01)
(52) U.S. Cl. ...................... 719/314; 718/100
(58) Field of Classification Search ........... 718/100, 718/105–107, 104; 719/314
See application file for complete search history.

(56) References Cited

U.S. PATENT DOCUMENTS

| | | | | |
|---|---|---|---|---|
| 5,553,305 A * | 9/1996 | Gregor et al. | ............... | 718/106 |
| 5,678,007 A * | 10/1997 | Hurvig | ..................... | 709/227 |
| 6,195,676 B1 * | 2/2001 | Spix et al. | ................... | 718/107 |
| 6,389,446 B1 * | 5/2002 | Torii | ......................... | 718/100 |
| 6,560,628 B1 * | 5/2003 | Murata | ....................... | 718/103 |
| 6,983,462 B2 * | 1/2006 | Savov et al. | ................ | 718/104 |

\* cited by examiner

*Primary Examiner*—William Thomson
*Assistant Examiner*—Phuong N. Hoang

(57) ABSTRACT

A buffer ring is utilized to track and control the distribution of information. Index variables that refer to storage locations or slots in the buffer ring are utilized to track the receipt and distribution of information. The variables initially point to the same slot. As information is received a status indicator associated the slot is checked and if the location is free either the product information elements or addresses of where the product information are entered in the slots. They are tracked by a producer variable that is incremented to indicate the next available slot. Slots between the consumer variable and the producer variable define a segment of the buffer associated with a particular thread. The information is forwarded to a thread based upon the variables. As product information elements are forwarded control of the buffer ring is obtained and the variables determine a buffer segment that is forwarded.

13 Claims, 12 Drawing Sheets

SYSTEM AND METHOD FOR EFFICIENTLY PROCESSING INFORMATION IN A MULTITHREAD ENVIRONMENT

BACKGROUND OF THE INVENTION

1. Field of the Invention

This invention relates to the field of information communication and processing. In particular, the present invention relates to a system and method for efficiently communicating and processing information in a multithread (e.g., multiprocessor) system.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Frequently, advanced computer applications are needed to realize these advantageous results and these advanced applications require increasingly powerful computer devices. The demand for ever greater functionality and convenience has resulted in a need for increased performance in smaller packages. One approach to providing increased capabilities is to utilize multiple threads (e.g., multiprocessors) to communicate and process information. However, utilizing multiple threads often gives rise to number of problems such as inefficient task distribution and coherency management difficulties between the parallel threads.

The communication and processing of information usually requires the maintenance of a particular order in performing tasks. Numerous electronic devices include processors that operate by executing programs comprising a series of instructions. These programs and their series of instructions, are collectively referred to as software. Software instructions include directions that guide processor device functions in the performance of useful tasks. If a predetermined order is not maintained during the communication or processing of information it often results in erroneous and/or incomprehensible results.

Traditionally the tasks are performed in a serial manner in which one operation is performed and then the next operation is performed one after another in a linear fashion. A purely sequential system typically requires a lot more time to complete a series of operations since one operation is not performed until the preceding operation is completed. The utility a processor device provides often depends upon the speed and efficiency at which instructions included in a software program are executed. In a serial system the assignment of tasks is rigidly predetermined based upon the sequential order of the tasks. This rigidly predetermined sequence does not permit parallel operations and associated time savings.

Numerous applications typically have operations that are not dependent upon the results of earlier processes. One conventional attempt at increasing computer performance involves the implementation of multiprocessor systems. Multiprocessor systems have multiple processors that are capable of operating independently of one another and performing parallel operations. One processor is capable of performing tasks (such as processing information) while another processor is also performing tasks. The parallel processing of information has the potential to reduce the overall time it takes to complete a number of tasks since more than one task can potentially be performed at the same time. However, even though the processors are capable of operating independently and performing tasks at the same time, some operations require results from other operations before beginning their allotted tasks. There is still a need for efficient task distribution and coherency management between the parallel processors.

Systems that are capable of parallel operations typically involve the commitment of significant resources. For example, systems capable of parallel processing typically have multiple processors that are relatively expensive or systems that provide parallel communications have duplicative communication medium (e.g. wires, fiber optic cables, etc.) between communication points. In addition, systems that provide parallel operations typically require complicated and extensive support resources. The commitment of significant resources in systems that are capable of providing parallel operations increases the need for efficient task distribution and coherency management between the parallel threads. Inefficient assignment of tasks between parallel resources usually results in wasting resource capabilities. If a disproportionate amount of the tasks are assigned to a busy thread while other threads are idle then the idle resource capabilities are not contributing to speeding up the overall operation rate. It is also a waste of valuable resources if a disproportionate amount of the tasks are assigned to a slow thread while other threads capable of processing the information faster are not sufficiently utilized.

Thus, what is required is a solution that facilitates efficient task assignment and coherency management for systems that provide the advantages of multi-thread operations with respect to increasing performance. The present invention provides a novel solution to the above problems.

SUMMARY OF THE INVENTION

The present invention is a solution that facilitates efficient task assignment and coherency management for systems that provide the advantages of multi-thread operations with respect to increasing performance. A buffer ring is utilized to track and control the distribution of information. Index variables that refer to storage locations or slots in a buffer ring are utilized to track the receipt and distribution of the information. As product information elements from a producer are received they are tracked by a producer variable. Either the product information elements or addresses (e.g., indicating a storage location of the information) into slots of the buffer ring and the producer variable is incremented to indicate the next available slot. A status indicator associated with a slot is checked and a determination is made if the location is free or busy. If the location is free, it is loaded with information and marked as busy. The slots between the consumer variable and the producer variable define a segment of the buffer ring associated with a particular thread and the product information elements are forwarded based upon which thread a segment is associated with. As product information elements are forwarded control of the buffer ring is obtained and the index variables (e.g., between a local producer variable and a local consumer variable) determine a buffer ring segment that is to be forwarded. The control of the identified segment is relinquished and storage slots are marked as free.

In one embodiment of the present invention, a multi thread management method provides efficient allocation and access to information for multiple threads. A ring initialization process is executed in which a status indicator for storage locations or slots in a buffer ring are set to indicate the storage locations are free. The initialization process also sets a global producer variable and a global consumer variable to point to the same location in the ring (e.g., location zero), indicating that the ring is empty. Product element information is received for distribution to a thread and a producer loading process is performed. The producer loading process directs information loading in the buffer ring. A status indicator associated with the storage location the global producer is pointing to is checked and a determination is made if the status indicator indicates the location is "free" or "busy". If the location is free the location is loaded with newly produced information and marks the location as busy. A global producer index is updated to point to the next location in the ring. Then a consumer forwarding process is implemented which directs forwarding of information from the buffer ring. Control of a storage ring is obtained and the index variables are checked to determine a segment of the storage ring that is to be consumed. In one embodiment of the present invention, the identified consumption segment includes the storage locations between a local producer variable and a local consumer variable. Information from the identified consumption segment of the buffer ring is forwarded to a consumer.

DETAILED DESCRIPTION OF THE INVENTION

Figure 1:
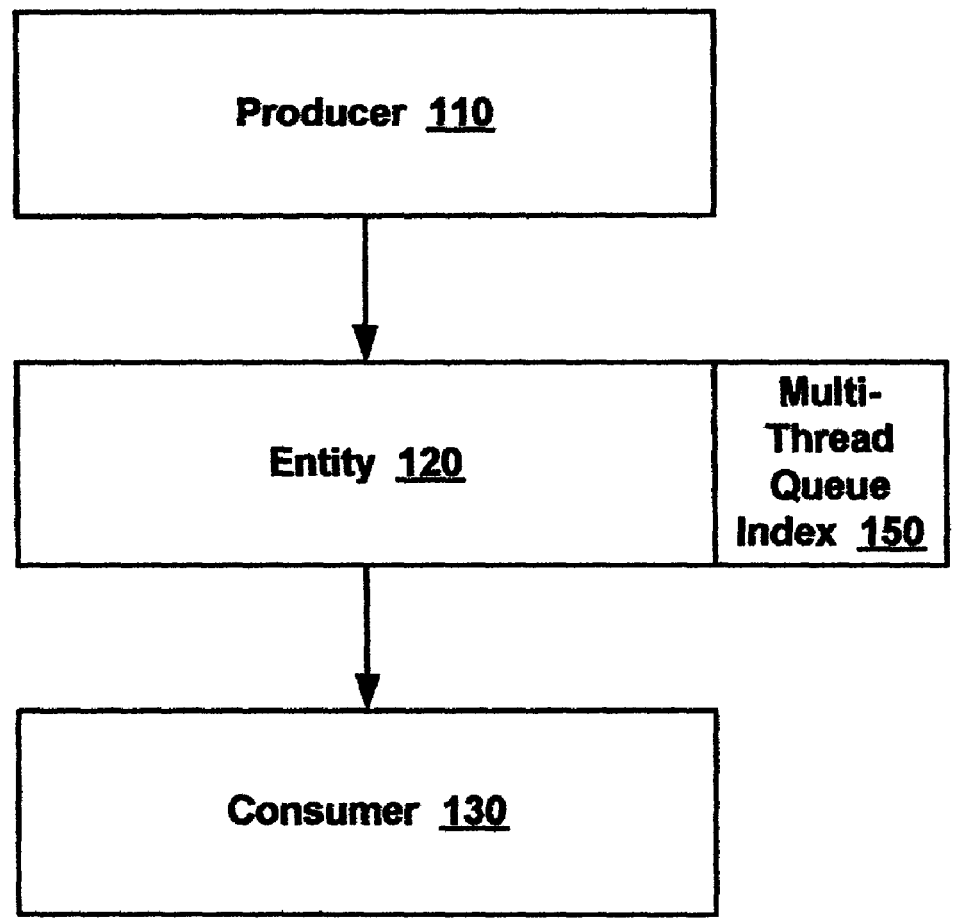
FIG. 1 is a block diagram of a multi thread management system in a producer consumer architecture, one embodiment of the present.

Reference will now be made in detail to the preferred embodiments of the invention, a system and method for efficiently processing information in a multithread environment, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing, computing, translating, calculating, determining, scrolling, displaying, recognizing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a block diagram of a multi thread management system 100 in a producer consumer architecture, one embodiment of the present invention. The producer consumer architecture comprises producer 110, entity 120 and consumer 130. Entity 120 is coupled to producer 110 and consumer 130. The identification of a producer or consumer is determined based on the flow of information relative to the entity. The producer provides information to the entity and the consumer takes information from the entity. For example, a producer provides input information to the entity and the consumer receives output information from the entity. Entity 120 is communicatively coupled to a multithread queue index 150 that tracks and controls the flow of information into and out of entity 120. In one embodiment of the present invention, multithread queue index 150 tracks which components of entity 120 are utilized by individual threads. In one exemplary implementation of the present invention, segments of information are "flagged" with an index identification (e.g., a local producer variable, a local consumer variable, etc.) corresponding to a thread. In an alternate embodiment, pointers (e.g., addresses) to memory locations comprising information are "flagged" with an index identification. The index identification is utilized to indicate that information is assigned to a particular thread. In one embodiment of the present invention, the entity 120 is a buffer ring.

In one embodiment of the present invention, multithread queue index 150 includes a producer index (pi) and a consumer index (ci). The producer index tracks the values of producer index variables (e.g., global producer variable, a first local producer variable, a second local producer variable, etc.). The consumer index tracks the values of consumer index variables (e.g., global consumer variable, a first local consumer variable, a second local consumer variable, etc.). In one exemplary implementation, the values of producer index variables and the values of consumer index variables are utilized to identify products (e.g., information) produced by producer 110 that are assigned to resources within entity 120 and are for consumption by consumer 130.

Figure 2A:
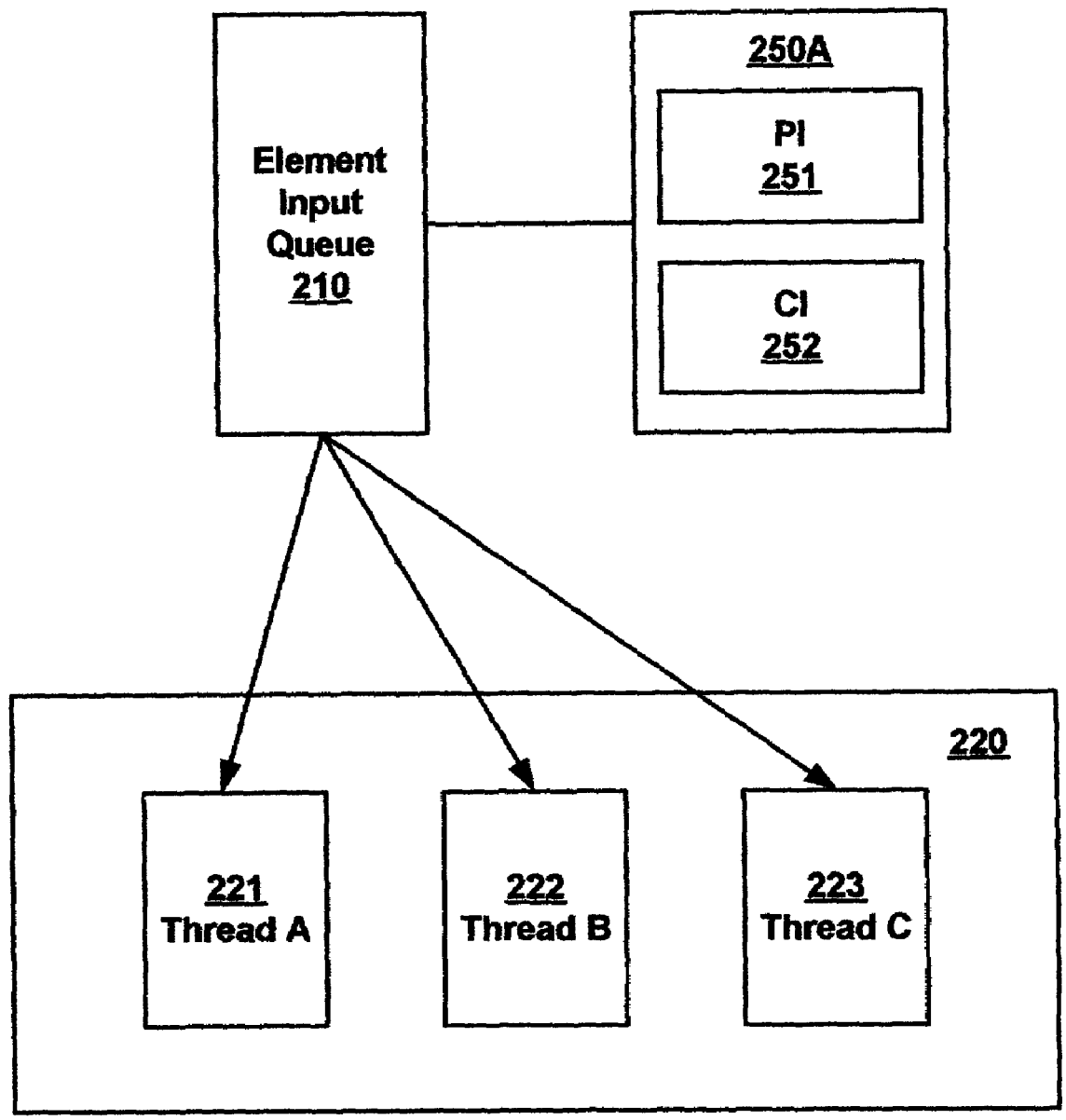
FIG. 2A is a block diagram of a producer consumer queue multi thread system, one embodiment of the present invention.

FIG. 2A is a block diagram showing a producer consumer queue multi thread system 200A, in accordance with one embodiment of the present invention. Producer consumer queue multi thread system 200A comprises product element input queue 210, multithread execution component 220, and multithread queue index 250A. Multithread queue index 250A is coupled to input queue 210 which is coupled to multithread execution component 220. It is appreciated that the present invention is readily adaptable to a variety of multiple thread operations including multiprocessor environments and parallel communication networks.

The components of producer consumer queue multi thread system 200A cooperatively operate to provide efficient distribution of tasks to multiple thread operations in accordance with direction from multithread queue index 250A. Product element input queue 210 receives product input information from a producer (not shown) and distributes the product input information to the multiple thread operations 221, 222, and 223. In one embodiment of the present invention, product element input queue 210 is a buffer that temporarily stores product element input information received from the producer. Multithread execution component 220 performs multithread operations. Multithread queue index 250A tracks and controls the distribution of information from product element input queue 210 to multithread operations in multithread execution component 220. (e.g., in a producer consumer architecture).

In one embodiment of the present invention, multithread queue index 250A tracks information in element input queue 210 by using index identifiers. For example, multithread queue index 250A utilizes global index identifiers (e.g., a global producer variable, a global consumer variable, etc.) to track the overall flow of information in product element input queue 210 and local index identifiers (e.g., a local producer variable, a local consumer variable, etc.) to track information in product element input queue 210 assigned to a particular thread. In one exemplary implementation producer index (PI) 251 tracks the values of producer index variables (e.g., global producer variable, a first local producer variable, a second local producer variable, etc.) and consumer index (CI) 252 tracks the values of consumer index variables (e.g., global consumer variable, a first local consumer variable, a second local consumer variable, etc.).

The assignment of index identifiers to product element input information determines which thread the product element input information is forwarded to. In one embodiment, the element input information is assigned to a thread based upon the workload of that thread. For example, if a first thread already has a lot of information assigned to it, multithread queue index 250A "flags" incoming product element input information with index identifiers associated with a second thread that has less information assigned to it. Thus, multithread queue index 250A helps to maintain a relatively balanced information load assignment between different threads. In another exemplary implementation of the present invention, if a first thread is slow in processing information assigned to it, multithread queue index 250A "flags" incoming product element input information with index identifiers associated with a second thread that is faster at processing information assigned to it. Thus, multithread queue index 250A facilitates increasing the overall speed at which information is processed.

In one embodiment of the present invention, multithread execution component 220 includes multiple processors that perform processing tasks on the input information. In an alternate embodiment, multithread execution component 220 is a parallel communication network that communicates input information over multiple communication paths. In one exemplary implementation of the present invention, the processing operations and/or communication operations are performed in parallel. In one exemplary implementation of the present invention, the product element input information is divided up into units of predetermined length (e.g. packets, frames, etc.).

Figure 2B:
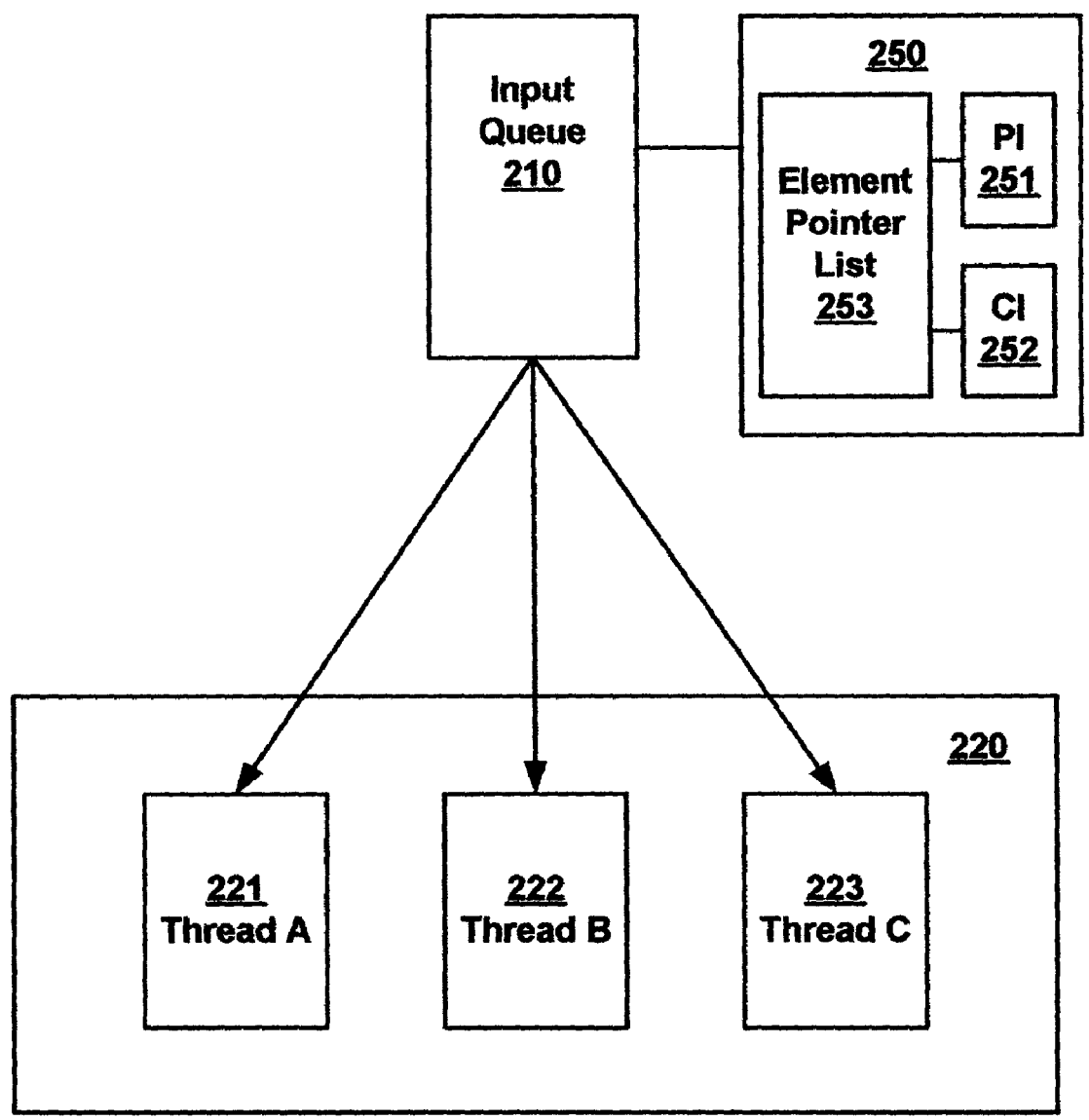
FIG. 2B is a block diagram of another example of a producer consumer queue multi thread system in accordance with one embodiment of the present invention.

The present invention is readily adaptable to a variety of configurations. For example, the indexes of a multithread queue index may track the input information directly or they may track pointers to the input information. FIG. 2B is a block diagram showing a producer consumer queue multi thread system 200B, in accordance with one embodiment of the present invention. Producer consumer queue multi thread system 200B is similar to producer consumer queue multi thread system 200A, except producer consumer queue multi thread system 200B tracks pointers to the product element input information. Multithread queue index 250B includes an element pointer list component 253 that stores addresses of input queue 210. Producer index 251 and consumer index 252 track indicators of slots in element pointer list 253. For example, a producer index or variable is assigned a slot identifier. In one exemplary implementation, the slots are equal widths comprising the same number of bits.

In one embodiment of the present invention, a buffer ring is utilized to track and control the receipt and distribution of product information. A product comprises product elements that include portions of the product information which is produced by a producer and consumed by a consumer. The product elements or alternatively indicators of product elements are placed in a buffer ring that holds up to N units of information (e.g., packets, addresses, etc.). For ease of discussion the contents of the buffer ring will be referred to as information, whether the buffer ring is storing product elements themselves or indicators of a product element (e.g., an address in a memory or buffer where the product element is stored). In one exemplary implementation, the information is queued and stored in a buffer with each piece of information stored in a predefined portion of the buffer (e.g., a slot). As each piece of information is placed in a buffer ring the slot is tracked. In one exemplary implementation of the present invention, each buffer ring slot is tracked by an index (e.g., 150). For example, the information is "flagged" by an index number corresponding to a slot. In one embodiment of the present invention, the index includes a producer index (pi) and a consumer index (ci).

In one exemplary implementation, the producer index indicator and consumer index indicator start at zero and go up to N−1. When information is put into a slot (e.g., a storage space in the buffer ring) the producer index is incremented to point to the next available slot. For example, if the producer puts 4 units of information (e.g. 4 packets, 4 addresses, etc.) into the first four slots starting at zero the producer index is incremented to point the next available slot, which would be slot 4. As information is entered in a slot the slot is marked as occupied or "busy" in one exemplary implementation. The consumer index points to the most recently consumed packet. In one embodiment of the present invention, control of a spin lock is obtained at the initiation of consumption activities. Once the information started being consumed (e.g., removed from the buffer ring) the consumer index increments as each piece of information is consumed until it points to the same slot as the producer index, which is slot 4 in the present example. As information is consumed or removed from the buffer ring the slot is marked as unoccupied or "free". A difference in the producer index and the consumer index indicates information is available for consumption and when they are equal it indicates the information has been consumed.

Figure 3A:
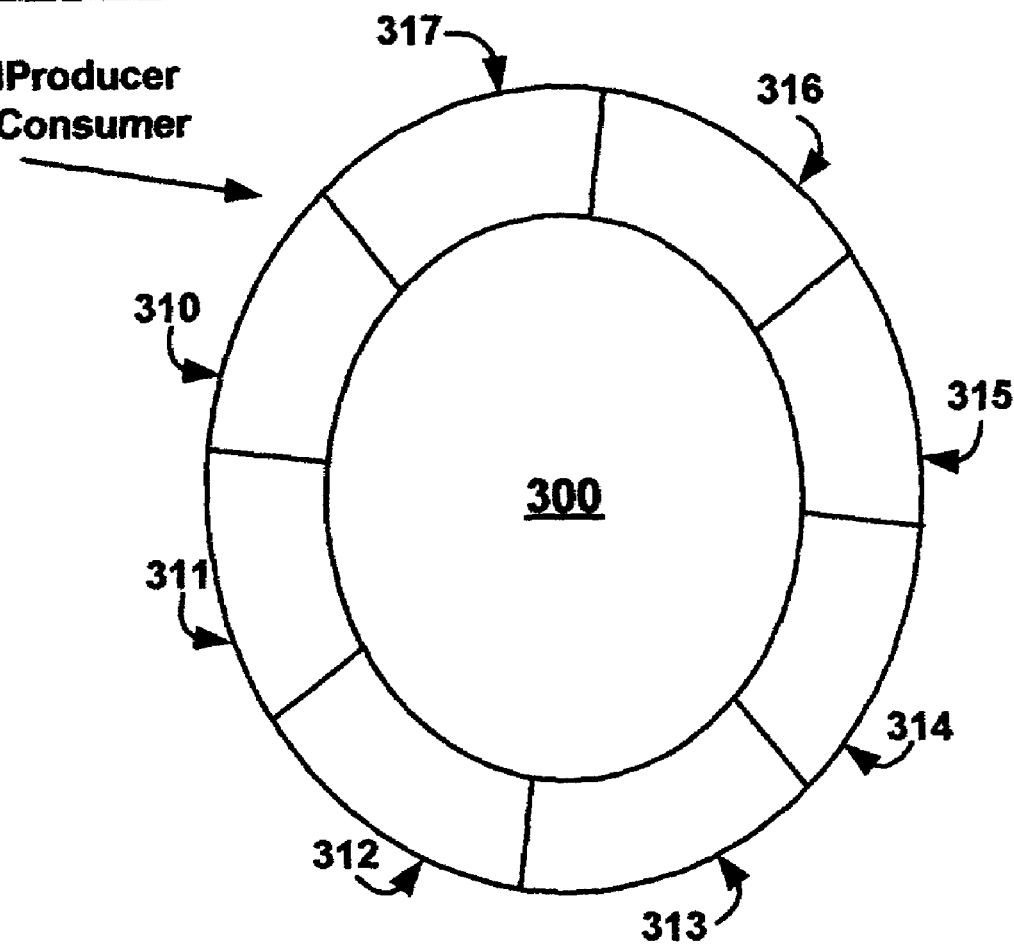
FIG. 3A is a block diagram showing one exemplary implementation of buffer ring initialization in which the global producer variable and the global consumer variable are set to the same buffer ring slot location in accordance with one embodiment of the present invention.

FIGS. 3A through 3E are block diagrams of producer and consumer interactions with buffer ring 300 in accordance with one embodiment of the present invention. Buffer ring 300 comprises storage slot locations 310 through 317. FIG. 3A is a block diagram showing one exemplary implementation of buffer ring 300 initialization in which a global producer variable and a global consumer variable are set to the same buffer ring slot location (e.g., 310). The initialization slot can be any slot in the buffer ring and the global producer variable and the global consumer variable are set to that buffer ring slot location.

Figure 3B:
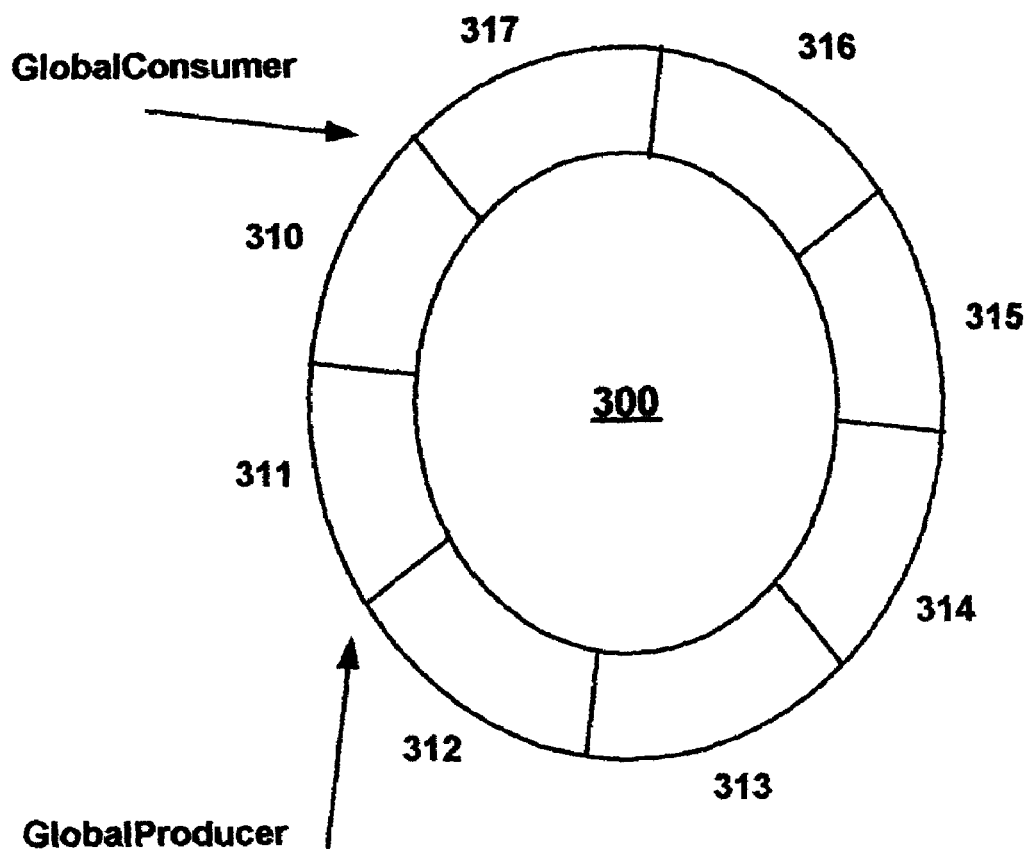
FIG. 3B is a block diagram showing one exemplary implementation of buffer ring receiving a producer request in accordance with one embodiment of the present invention.

FIG. 3B is a block diagram showing one exemplary implementation of buffer ring 300 receiving a producer request. The producer request is for information the size of two slots and the information is stored in slots 310 and 311. For example, the information may be a product element or an indicator (e.g., an address) of a product element storage location. The global producer variable is set to point to the next available slot (e.g., 312). After the global producer variable is set the consumer routine is scheduled.

Figure 3C:
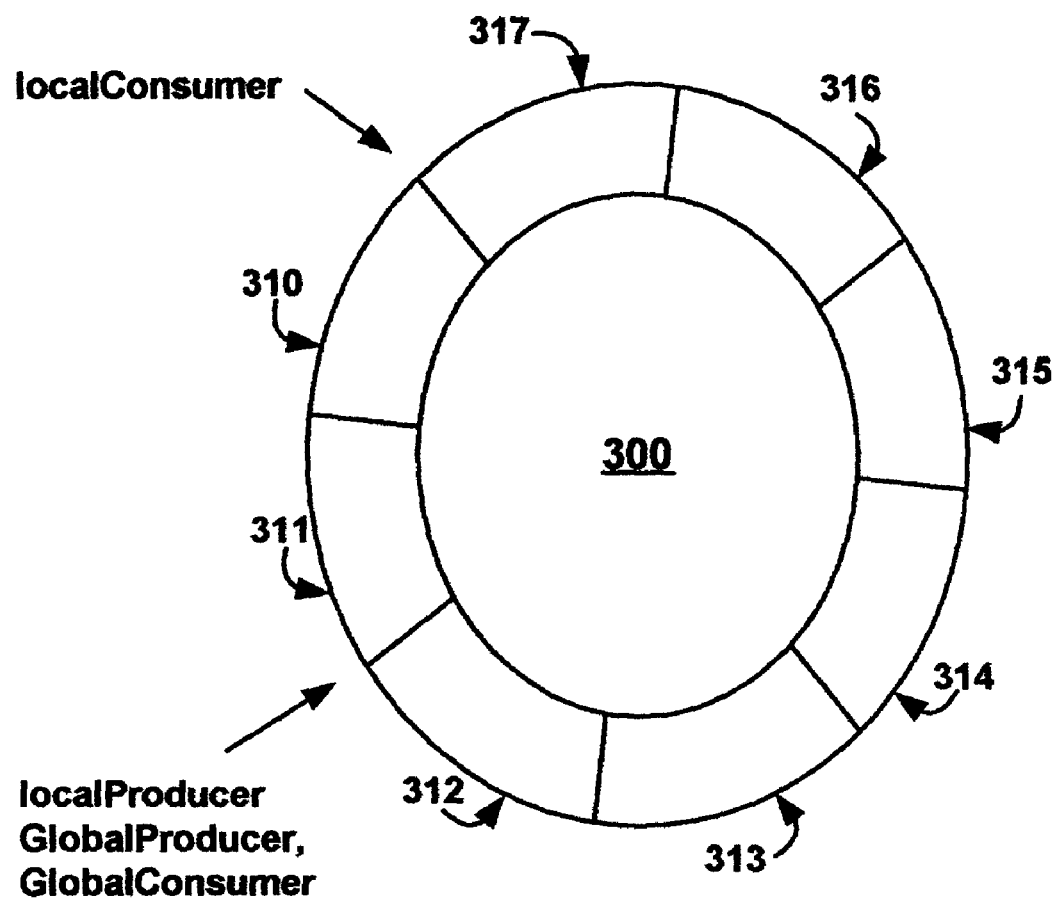
FIG. 3C is a block diagram showing one exemplary implementation of buffer ring running a consumer routine instance A in accordance with one embodiment of the present invention.

FIG. 3C is a block diagram showing one exemplary implementation of buffer ring 300 running a consumer routine instance A (e.g., on thread A). A local producer variable is set to point to the slot indicated by the global producer variable, a local consumer variable is set to point to the slot indicated by the global consumer variable, and the global consumer variable is reset to point to the slot indicated by the local producer. The consumer routine instance A takes ownership of the buffer ring slots between the local consumer and the local producer and processes the elements. In one exemplary implementation, consumer routine instance A obtains control of a spin lock before retrieving information from the buffer ring. The slots (e.g., with either the elements or element storage address) are marked as free after the elements are consumed (e.g., processed, communicated, etc.) by consumer routine instance A and when the elements associated with a segment are consumed the control of the segment is returned (e.g., to an operating system).

Figure 3D:
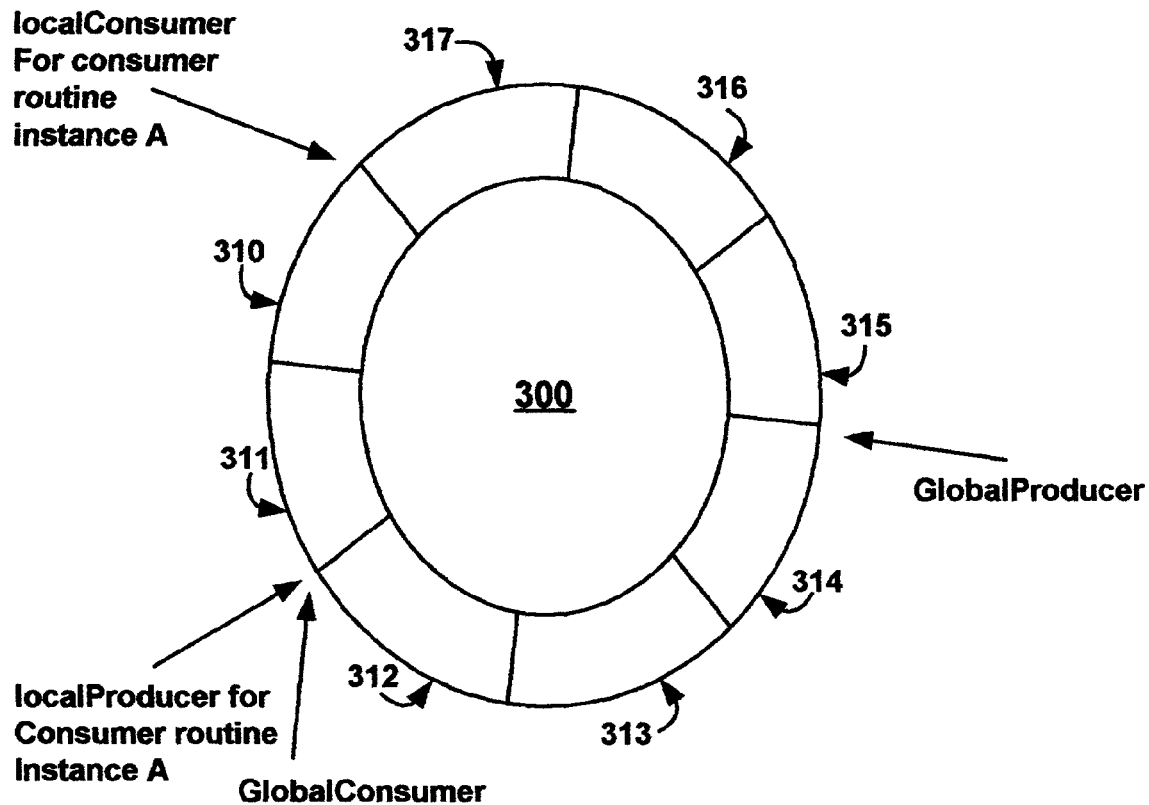
FIG. 3D is a block diagram showing one exemplary implementation of buffer ring receiving producer requests while running a consumer routine instance in accordance with one embodiment of the present invention.

FIG. 3D is a block diagram showing one exemplary implementation of buffer ring 300 receiving producer requests while running a consumer routine instance. In one embodiment of the present invention, a first consumer instance continues to run consuming one product element base on one slot of information (e.g., 310) in the buffer ring. The local consumer variable for consumer routine instance A is updated to reflect the consumption of a product element and is changed to point to slot 311. The local producer variable for consumer routine A and global consumer variable still point to slot 312. The global producer variable is set to point to slot 315 since the new producer activities fills up three slots with information (e.g., either a product element or an address of a product element).

Figure 3E:
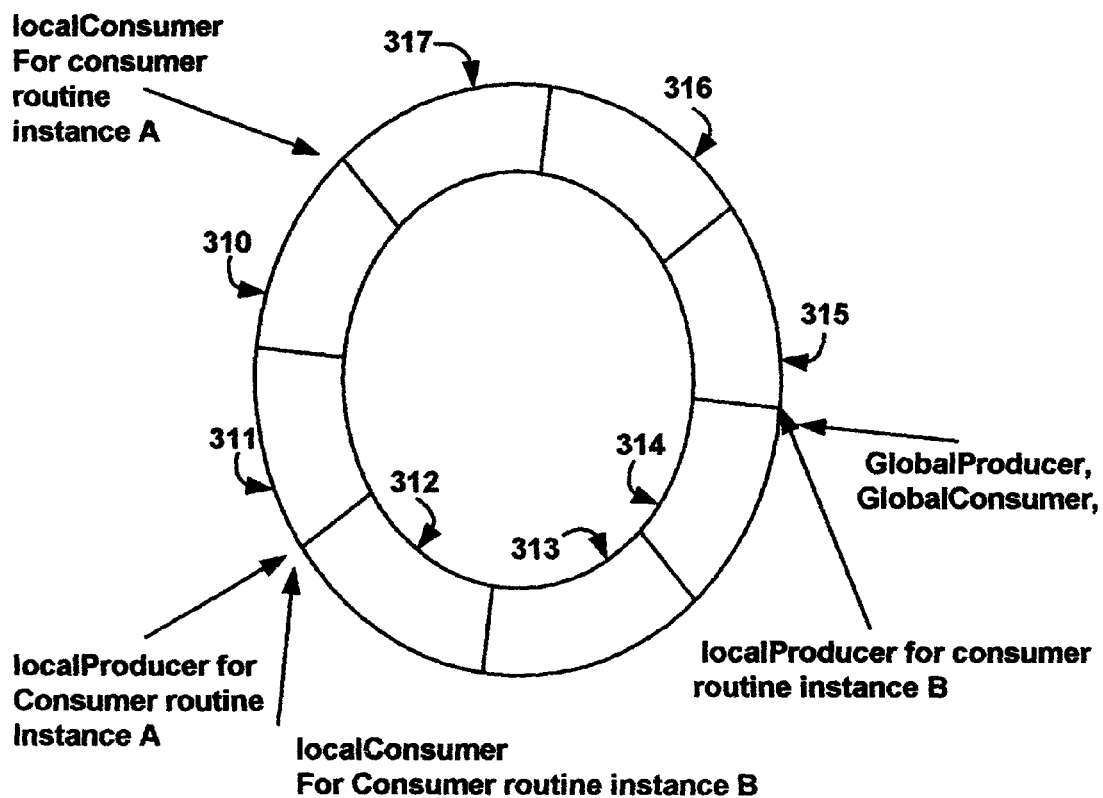
FIG. 3E is a block diagram showing one exemplary implementation of buffer ring running multiple consumer instances in accordance with one embodiment of the present invention.

FIG. 3E is a block diagram showing one exemplary implementation of buffer ring 300 running multiple consumer instances. A first consumer instance is running on a first processor and a second instance is running on a second processor in parallel. The first instance is similar to FIG. 3D and the second instance handles the tracking similar to the first instance. A second instance local producer variable is set to point to the slot indicated by the global producer variable, a second instance local consumer variable is set to point to the slot indicated by the global consumer variable, and the global consumer variable is reset to point to the slot indicated by the local producer. In one exemplary implementation, the first consumer instance gains control of the spin lock and retrieves information from the buffer ring. The second instance is running in parallel and is able to retrieve the information from the buffer ring by obtaining control of the spin lock. If the second instance attempts to retrieve information while the first instance has control of the spin lock, the second instance temporarily continues to "spin" (e.g., attempt to gain control of the spin lock) until the first instance relinquishes control of the spin lock.

In one embodiment, the present invention permits efficient processing of requests in a producer-consumer environment implemented on a multi-processor machine. In one exemplary implementation, the producer is a network interface card and the product elements include information (e.g. packets or frames) received from a network which are consumed by a software driver that utilizes the information received form the network. In one embodiment of the present invention, the operating system supports multiple threads and has knowledge of the status of the processors and schedules the consumer as soon as it finds a processor that is free. In one embodiment of the present invention the processors are synchronized (e.g., using spin locks or similar mechanism). In one embodiment of the present invention, an index includes a global producer index or variable (e.g., GlobalProducer) and a global consumer index or variable (e.g., GlobalConsumer) which point to a storage slot in the buffer ring (e.g., a location address in the storage buffer ring). Each storage slot in the storage ring also has a status indicator associated with it. If the storage location is not used the status indicator is set to indicate the storage space is free otherwise the status indicator is set to indicate the storage space is occupied or "busy". Initially the status indicator for the storage locations in the ring are set to indicate the locations are free and the global producer variable and the global consumer variable are set to point to the same location in the ring (e.g., location zero), indicating that the ring is empty.

Figure 4:
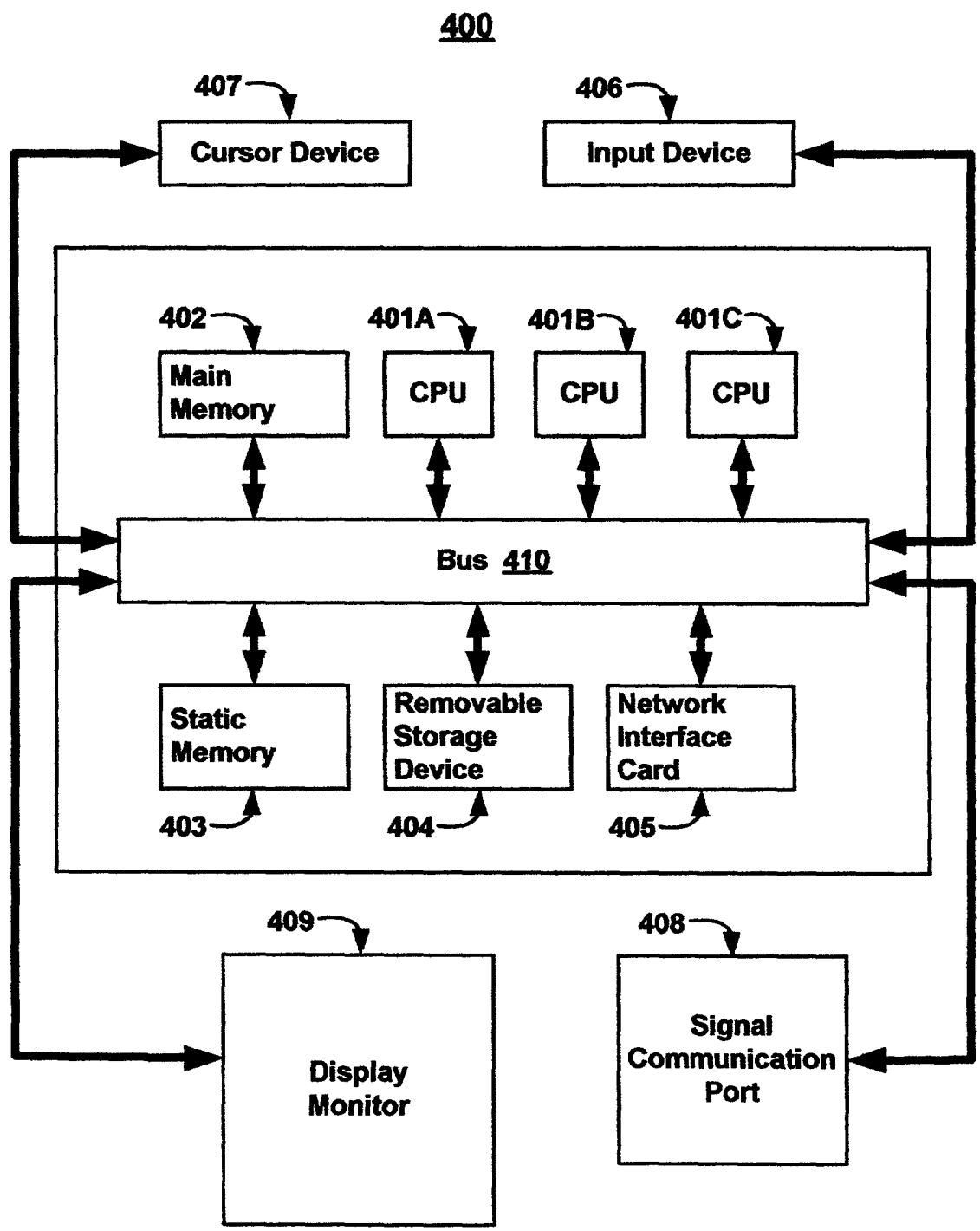
FIG. 4 is a block diagram of one embodiment of a computer system upon which the present invention is implemented.

FIG. 4 is a block diagram of computer system 400, one embodiment of a computer system upon which the present invention is implemented. Computer system 400 includes address/data bus 410, central processor units 401A, 401B, 401C, main memory 402 (e.g., random access memory), static memory 403 (e.g., read only memory), removable data storage device 404, network interface card (NIC) 405, input device 406 cursor device 407, display monitor 409, and signal communications port 408. Address/data bus 410 is coupled to central processor units 401A, 401B, 401C, main memory 402, static memory 403, removable data storage device 404, network interface card 405, input device 406 cursor device 407, display monitor 409, and signal communications port 408.

The components of computer system 400 cooperatively function to provide a variety of functions, including efficient assignment of tasks between the processors. Address/data bus 410 communicates information, central processors 401A, 401B and 401C process information and instructions, main memory 402 stores information and instructions for the central processors 401A through 401C and static memory 403 stores static information and instructions. Removable data storage device 404 provides also stores information and instructions (e.g., functioning as a large information reservoir). NIC 405 coordinates the communication of information to and from computer system 400 via signal communication port 408. Display device 409 displays information. Cursor device 407 provides a mechanism for pointing to or highlighting information on the display device. Input device 406 provides a mechanism for inputting information.

In one embodiment of the present invention, computer system 400 includes a producer consumer queue multi thread system (e.g., similar producer consumer queue multi thread system 100). In one exemplary implementation of the present invention, a network interface card 405 operates as an entity in a producer consumer architecture. In one exemplary implementation of the present invention, NIC 405 is coordinating the flow of information from a communication network to the central processors 401A through 401C. In one example, a communications network functions as a producer and the central processors 401A through 401C function as the consumers. The central processors 401A through 401C are capable of operating in parallel and each one forms a processing thread. In one embodiment of the present invention, NIC 405 includes a multithread queue index (e.g., similar to 150), an input queue (e.g., similar to 110), and output queue (e.g., similar to 130). Central processors 401A through 401C operate as a multithread execution component (e.g., similar to 120). In one exemplary implementation, the same software code or instructions are utilized to perform processing on information in different buffer ring segments or "stacks" having different local variables.

In one embodiment of the present invention, the entity in a producer consumer architecture is the operating system. In this embodiment the producer and consumer definitions are at the application level. For example, one application component operates as a producer and another one operates as a consumer.

Figure 5:
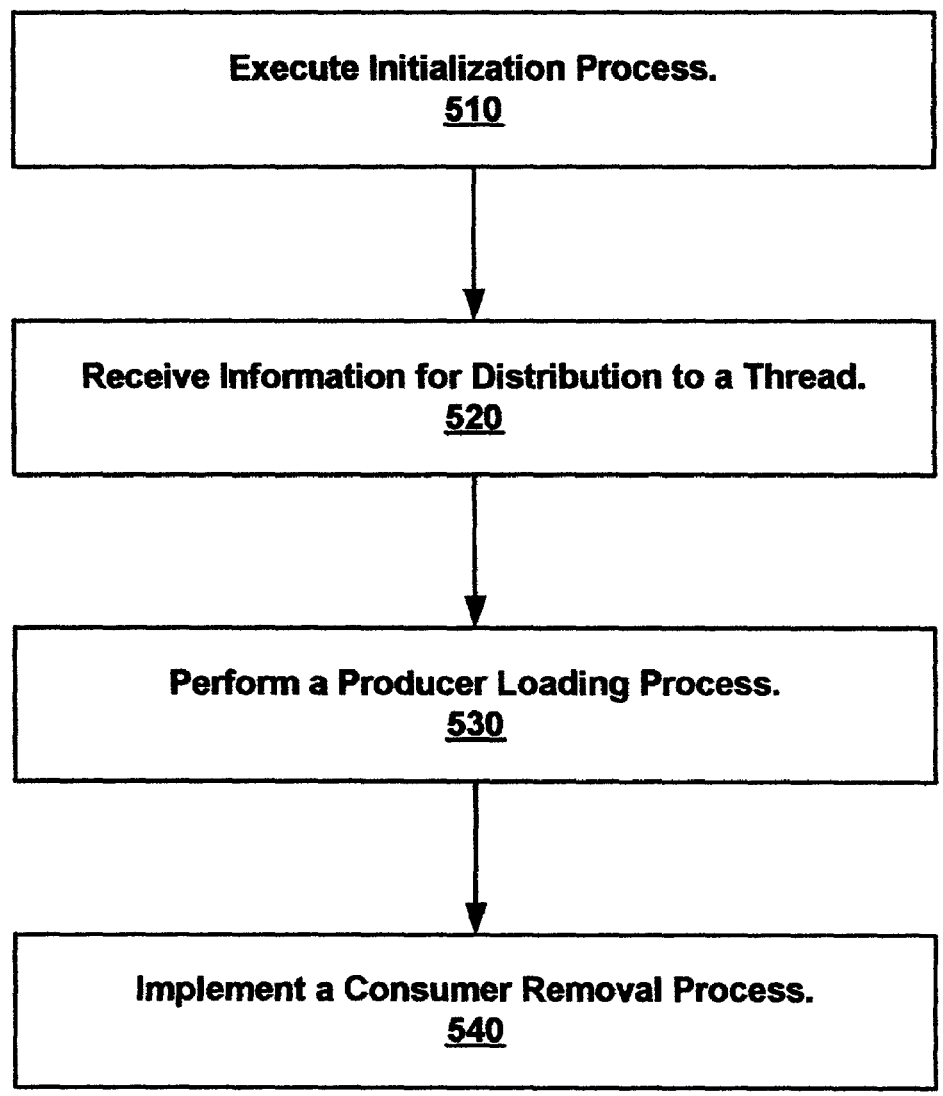
FIG. 5 is a flow chart of a thread management method, one embodiment of the present invention.

FIG. 5 is a flow chart of multi thread management method 500, one embodiment of the present invention. In one exemplary implementation multi thread management method 500 tracks and controls the flow of information to and from a buffer ring. Multi thread management method 500 provides efficient allocation and access to information for multiple threads. For example, information from a producer is received and tracked by multi thread management method 500. The information is distributed for consumption based upon the directions of multi thread management method 500. 10. In one embodiment of the present invention, multi thread management method 500 instructions are stored on a computer readable medium. When the instructions are executed by a computer system they cause the computer to implement the multi thread management process.

In step 510, an initialization process is executed. The initialization process resets indexes or variables that are utilized to track receipt and distribution of information product elements (e.g., in a multithread environment). In one embodiment of the present invention, status indicators for storage locations or "slots" (e.g., registers) in a buffer ring are set to indicate the slots are free. For example, a global producer variable and a global consumer variable are set to point to the same slot in the buffer ring (e.g., location zero), indicating that the buffer ring is empty (e.g., nothing has been produced).

In step 520, information product elements are received for distribution to a thread. In one embodiment, an information product element is received from a producer (e.g., 110) for storage in an input queue (210) or ring buffer (e.g., 300) that is associated with an entity (e.g., 120). For example, a NIC receives information from a network for processing by multi-thread processors.

In step 530, a product loading process is performed in which information product elements are tracked and assigned for distribution to a particular thread. In one embodiment of the present invention, the product loading process directs the operations associated with loading information (e.g., product elements, indications of product element locations, pointers to a memory address, etc.) on a buffer ring. In one exemplary implementation of the present invention, the producer loading process utilizes producer and consumer index variables to indicate segments of buffer ring slots filled with information assigned to a particular thread.

The present invention is readily adaptable to a variety of algorithms for assigning product element information to a particular thread. In one embodiment, the element input information is assigned to a thread based upon the workload of that thread. For example, product element information may assigned to threads in a manner that maintains a relatively balanced information load assignment between different threads (e.g., product information of a predetermined amount may be assigned to threads in a round robin scheme). In another exemplary implementation of the present invention, the element input information is assigned to a thread based upon the processing or communication speed of that thread. For example, more product information may be assigned to "faster" threads and less product information to "slower" threads in a manner that increases the overall speed of system operations. Thus, multi thread management method 500 facilitates efficient task assignment and coherency management for systems that provide the advantages of multi-thread operations with respect to increasing performance.

Figure 6:
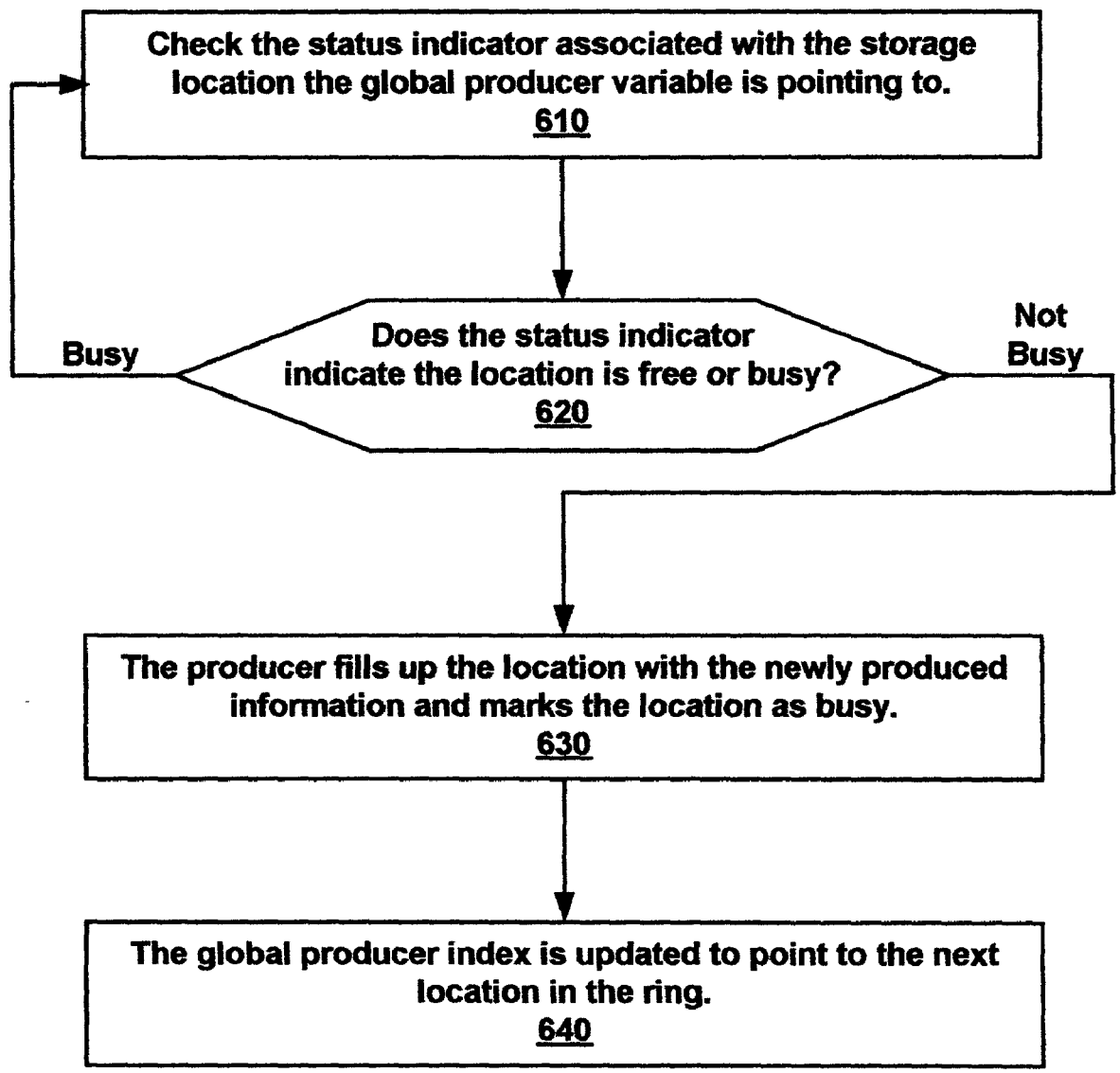
FIG. 6 is a flow chart of one embodiment of a present invention producer loading process.

FIG. 6 is a flow chart of product loading process 600, one embodiment of a present invention product loading process. In step 610, a status indicator associated with a location slot a global producer variable is pointing to is checked. At step 620, a determination is made if the status indicator indicates the location slot is "busy" (e.g., full) or is "free" (e.g., empty). If the location is busy the process returns to step

610. If a location is free, the producer fills up the location with newly produced information and marks the location slot as busy in step 630. In step 640, the global producer index is updated to point to the next location in the buffer ring.

Referring again to FIG. 5, a consumer forwarding process is implemented in step 540. In one embodiment of the present invention, a consumer forwarding process directs the operations of forwarding information from the buffer ring. In one exemplary implementation of the present invention, the consumer forwarding process updates producer and consumer index variables to indicate slots with information that has been forwarded. A consumer forwarding process includes obtaining control of a spin lock that prevents other consumer forwarding processes from accessing information from the buffer ring while one of the consumer forwarding processes has control of the spin lock.

Figure 7:
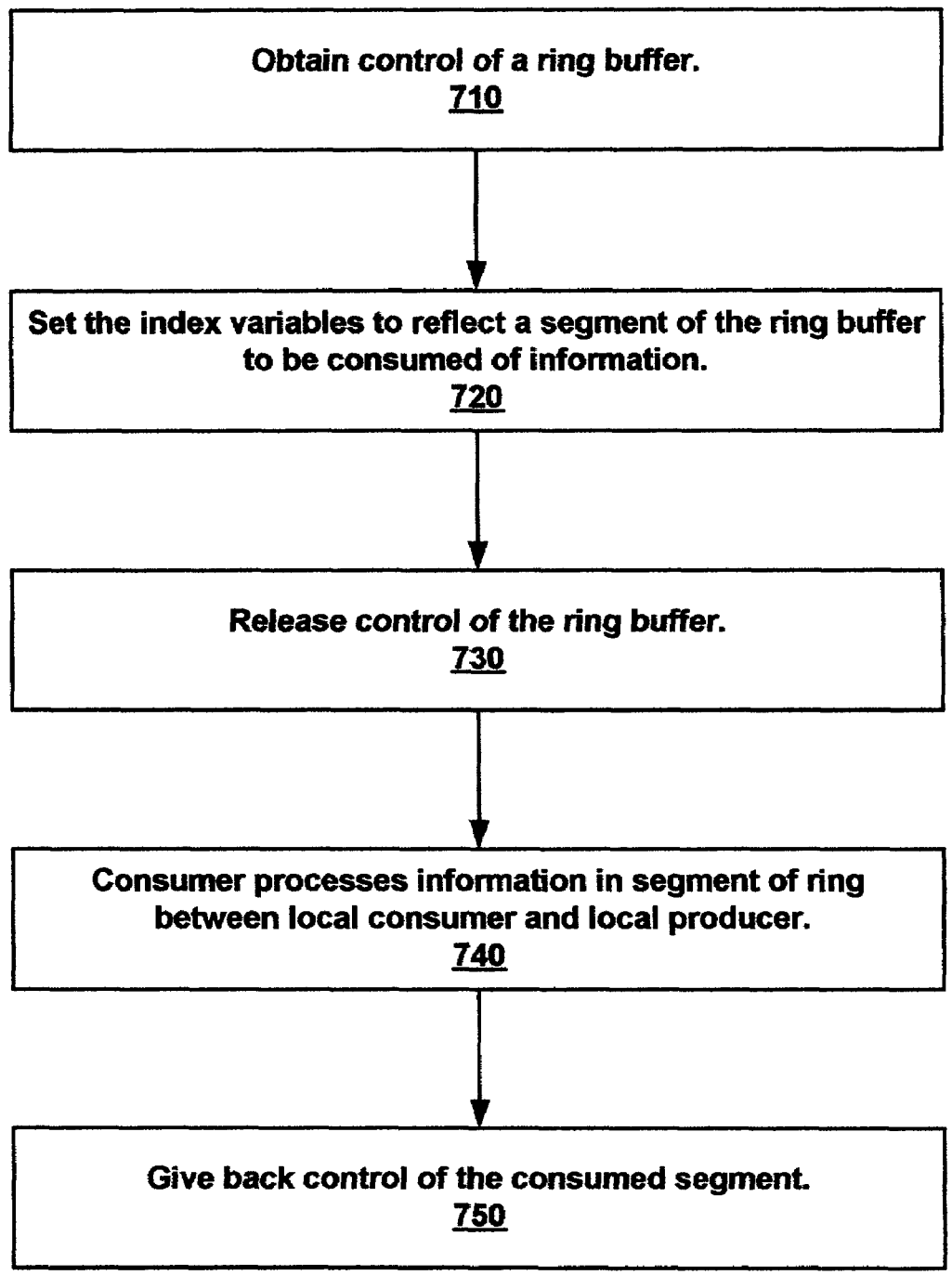
FIG. 7 is a flow chart of one embodiment of a present invention consumer removal process.

FIG. 7 is a flow chart of consumer forwarding process 700, one embodiment of a present invention consumer removal process. In step 710, control of a storage buffer ring is obtained. In one embodiment, obtaining control of the buffer ring includes controlling a spin lock to prevent access to the buffer ring by other consumer removal processes. The index variables are set to reflect a segment of the storage buffer ring that is to be consumed in step 720. In step 730, control of the storage buffer ring is released for additional information insertion except for an identified consumption segment. In one embodiment of the present invention, the identified consumption segment includes the storage locations or slots between a local producer variable and a local consumer variable. The product elements associated with the identified consumption segment is forwarded in step 740 to a consumer. For example, if the buffer ring includes product elements themselves the product elements are forwarded from the buffer ring. If the buffer ring includes address identifiers of where the product elements are stored, the those addresses are utilized to retrieve the product elements and forward them to the consumer. In Step 750 the control of the identified segment is relinquished. In one embodiment of the present invention, the consumed elements are marked as free.

Thus, the present invention is a system and method that facilitates efficient task assignment and coherency management. A present invention multi thread management system efficiently distributes information between tasks in a manner that improves overall performance of information processing and communication. Information is provided to multiple threads reducing the potential for wasting resource capabilities by enabling the threads to operate relatively independent of one another instead of sitting idle. The present invention helps reduce the likelihood that a disproportionate amount of tasks are assigned to a busy thread or a slow thread while other threads are idle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multi thread management method comprising:

executing a buffer ring initialization process that resets variables utilized to track receipt and distribution of information product elements in a buffer ring having a plurality of slots;

receiving, at the buffer ring, information product elements for distribution to a thread;

performing a product loading process in which the received information product elements are stored and tracked in one or more consecutive slots in the buffer ring in accordance with an assignment for distribution of the information product elements to a particular thread while incrementing a first variable from a most recently filled slot to a next consecutive slot as the information product elements are stored, wherein the next consecutive slot is an empty slot; and implementing a consumer forwarding process in which each of said received information product elements is forwarded from the consecutive slots in the buffer ring in accordance with said assignment for distribution to a particular thread while incrementing a second variable from a most recently consumed slot to a next consecutive slot in the buffer ring, wherein the next consecutive slot includes a received product information element; and wherein the multithread management method further comprises:

obtaining control of a buffer ring;

setting an index variables to reflect a segment of the buffer ring to be consumed;

releasing control of the buffer ring except for an identified consumption segment;

forwarding information from the identified consumption segment; and relinquishing control of the identified consumption segment.

2. The multi thread management method of claim 1, wherein a status indicator for a slot in the buffer ring is set to indicate a slot is busy when filled with information and is free when information is retrieved or when the initialization process is performed.

3. The multi thread management method of claim 1, wherein a global producer variable and a global consumer variable are set to point to the same slot location in the buffer ring indicating that said buffer ring is empty.

4. The multi thread management method of claim 1, wherein said producer loading process directs operations of loading information on the buffer ring.

5. The multi thread management method of claim 1, wherein said producer loading process utilizes producer and consumer index variables to indicate segments of slots that are filled with information.

6. The multi thread management method of claim 1, wherein said consumer forwarding process directs operations for forwarding information from the buffer ring.

7. The multi thread management method of claim 1, wherein said consumer forwarding process updates producer and consumer index variables to indicate slots with information that has been forwarded.

8. A computer readable medium comprising instructions which when executed by a computer system causes the computer to implement a multi thread management process comprising:

executing a buffer ring initialization process that resets variables utilized to track receipt and distribution of information product elements at a buffer ring;

receiving, at the buffer ring, information product elements for distribution to a thread;

performing a product loading process in which the received information product elements are stored and tracked in one or more consecutive slots in the buffer ring in accordance with an assignment for distribution of the information product elements to a particular thread while incrementing a first variable from a most recently filled slot to a next consecutive slot as the information product elements are stored, wherein the next consecutive slot is an empty slot; and implementing a consumer forwarding process in which each of said received information product elements is forwarded from the consecutive slots in the buffer ring in accordance with said assignment for distribution to a particular thread while incrementing a second variable from a most recently consumed slot to a next consecutive slot in the buffer ring, wherein the next consecutive slot includes a received product information element; and wherein the multithread management process further comprises:

obtaining control of a buffer ring;

setting an index variables to reflect a segment of the buffer ring to be consumed;

releasing control of the buffer ring except for an identified consumption segment;

forwarding information from the identified consumption segment; and relinquishing control of the identified consumption segment.

9. A computer readable medium comprising instructions which when executed by a computer system causes said computer system to implement a multi thread management process of claim 8 further comprising:

checking a status indicator associated with a slot a global producer is pointing to;

determining if said status indicator indicates said slot is free or busy;

filling up said slot with newly produced information and marking said slot as busy; and updating a global producer index to point to the next slot in the buffer ring.

10. A computer readable medium comprising instructions which when executed by a computer system causes said computer system to implement a multi thread management process of claim 8 wherein the identified consumption segment includes slots of the buffer ring between a local producer variable and a local consumer variable.

11. A computer readable medium comprising instructions which when executed by a computer system causes said computer system to implement a multi thread management process of claim 8 wherein the buffer ring, partitioned into slots, is utilized by said product loading process to track said assignment for distribution to a particular thread.

12. A computer readable medium comprising instructions which when executed by a computer system causes said computer system to implement a multi thread management process of claim 11 wherein a status indicator for a slot in said buffer ring is set to indicate said slot is free.

13. A computer readable medium comprising instructions which when executed by a computer system causes said computer system to implement a multi thread management process of claim 11 wherein a global producer variable and a global consumer variable are set to point to the same location slot in said buffer ring, indicating that said buffer ring is empty.

* * * * *